United States Patent
Del Pia et al.

(10) Patent No.: US 9,221,239 B2
(45) Date of Patent: Dec. 29, 2015

(54) METHOD FOR APPLYING STONES TO METALLIC ELEMENTS, PARTICULARLY FOR THE ADHESIVE BONDING OF GLASS CRYSTALS TO SURFACES OF TUBULAR ELEMENTS

(75) Inventors: Stefano Del Pia, Arezzo (IT); Alfredo Del Pia, Arezzo (IT); Giorgio Del Pia, Arezzo (IT)

(73) Assignee: DEL PIA S.R.L., Monte San Savino (AR) (IT)

(*) Notice: Subject to any disclaimer, the term of this patent is extended or adjusted under 35 U.S.C. 154(b) by 198 days.

(21) Appl. No.: 13/988,093

(22) PCT Filed: Nov. 17, 2011

(86) PCT No.: PCT/EP2011/070353
§ 371 (c)(1),
(2), (4) Date: May 17, 2013

(87) PCT Pub. No.: WO2012/066078
PCT Pub. Date: May 24, 2012

(65) Prior Publication Data
US 2013/0240121 A1 Sep. 19, 2013

(30) Foreign Application Priority Data
Nov. 19, 2010 (IT) .............................. AR2010A0029

(51) Int. Cl.
*A44C 17/04* (2006.01)
*B44C 5/00* (2006.01)
*B32B 37/12* (2006.01)

(52) U.S. Cl.
CPC ............. *B32B 37/1284* (2013.01); *A44C 17/04* (2013.01); *B44C 5/00* (2013.01); *Y10T 156/10* (2015.01)

(58) Field of Classification Search
CPC .................................. B44C 5/00; A44C 17/04
USPC ....................................................... 156/63, 153
See application file for complete search history.

(56) References Cited

U.S. PATENT DOCUMENTS 3,513,123 A * 5/1970 Saffir ............................ 523/116
5,565,499 A * 10/1996 Klemarczyk et al. ........... 522/13
2009/0313744 A1 12/2009 Hofer

FOREIGN PATENT DOCUMENTS

AT 010381 UI 2/2009
EP 2135749 A2 * 12/2009
(Continued)

OTHER PUBLICATIONS

Unknown: "Goldring mit Edelsteinen", www.qvc.de, Jul. 18, 2010, XP002649181, Retrieved from the Internet: URL: http://www.qvc.de/deqic/qvcapp.aspdapp.detail/params.item.657358/walk.yah.AAACCCDE?ref=PKZ&cmmmc=PANGORA—Deeplink—Datenfeed—SCH.
Unknown: "Ring mit Edelsteinen", multimedia.1-2-3.tv, Feb. 20, 2010, XP002649182, Retrieved from the Internet: URL:http://multimedia.1-2-3.tv/products/images/132158 00001 500x400.jpg.
International Search Report, dated Jun. 20, 2012, from corresponding PCT application.

*Primary Examiner* — Jeff Aftergut
(74) *Attorney, Agent, or Firm* — Young & Thompson

(57) ABSTRACT

A method for applying stones to metallic elements, particularly for the adhesive bonding of glass crystals to surfaces of tubular elements, which includes the steps of preparing an application surface (2) of a metallic element, spreading an adhesive medium (3) on the application surface (2) and making a single lateral face (4) of a first stone (5) to be applied adhere to the application surface (2). The axis of symmetry (10) of the first stone defines a first angle of intersection (8) with the application surface (2).

14 Claims, 1 Drawing Sheet

(56) References Cited

FOREIGN PATENT DOCUMENTS

| | | | |
|---|---|---|---|
| FR | 1040949 A | 10/1953 | |
| JP | 2006247357 A | 9/2006 | |
| WO | 2009071966 A1 | 6/2009 | |
| WO | WO-2009/071704 A2 * | 6/2009 | |

* cited by examiner

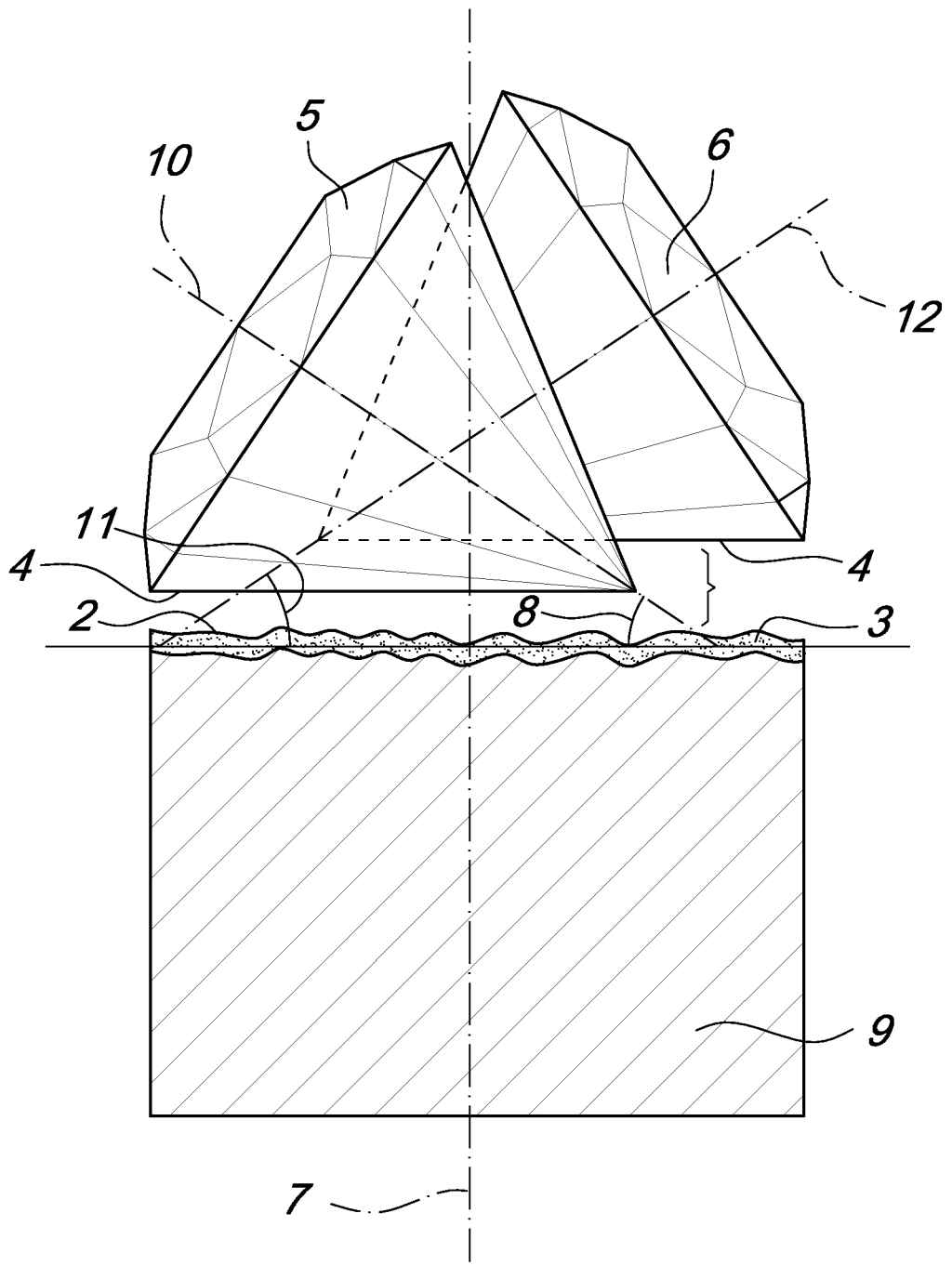

METHOD FOR APPLYING STONES TO METALLIC ELEMENTS, PARTICULARLY FOR THE ADHESIVE BONDING OF GLASS CRYSTALS TO SURFACES OF TUBULAR ELEMENTS

TECHNICAL FIELD

The present invention relates to a method for applying stones to metallic elements, particularly for the adhesive bonding of glass crystal to surfaces of tubular elements.

BACKGROUND ART

Industrial and craftworker methods are known of setting stones, especially glass crystals, in gold based metal alloys of different carat weight, which involve creating spaces in the resting surface that are adapted to receive the end portion of the stone.

Creating the spaces is expensive and complicated given the fact that exceptional precision work is required and it involves a high loss of metal due to mechanical working, with all the problems associated therewith, especially of economic nature.

Moreover, with regard to the positioning of stones on items of jewelry worn on the finger, wrist and neck, given the fact that the depth of the spaces is proportional to the size of the stone, not all crystals can be set in pieces of low thicknesses.

This obviously means that it is impossible to set medium to large stones in pieces of gold ware that are relatively "light", i.e. having a weight of metal lower than 2-3 grams, and therefore it does not enable the manufacture of competitive items of jewelry.

The requirement to produce increasingly light gold ware, jewelry and silver ware products is particularly felt in the gold and silver smithing field, because of the continuing increase in the price of the base metal, which has more than doubled in recent years. Therefore a large market segment requires items of jewelry worn on the finger, wrist and neck, of low thickness so as to keep the price of product low.

In addition to this, nowadays customers are no longer content to have a few high-value pieces, but instead view articles of jewelry, gold ware and silver ware less as a safe asset and more as an accessory to go with what is being worn according to the occasion and circumstances.

DISCLOSURE OF THE INVENTION

The aim of the present invention is to eliminate the abovementioned drawbacks in conventional types of methods for applying stones to metallic elements, by providing a method for applying stones to metallic elements, particularly for the adhesive bonding of glass crystals to surfaces of tubular elements, that enables the application of stones to metallic elements of low thickness, in particular the application of glass crystals to low-thickness products made of alloy of gold, silver or other precious metal, so as to keep the price of the item of jewelry low.

Within this aim, an object of the invention is to provide a method for applying stones to metallic elements, particularly for the adhesive bonding of glass crystal to surface of tubular elements, which firmly secures the stone to the application surface, without the danger of losing the stone.

Another object of the invention is to provide a method for the application of stones to tubular elements that is aesthetically appreciable, without the risk of damaging the item of jewelry or turning it opaque.

Another object of the invention is to enable the manufacture of quality jewelry, with a method that is quick and simple.

Another object of the invention is to provide a method for applying stones to metallic elements, particularly for the adhesive bonding of glass crystals to surfaces of tubular elements, with means that are readily available on the market and using commonly used materials, so that the method is economically competitive.

This aim and these and other objects which will become more apparent hereinafter, are achieved by a method for applying stones to metallic elements, particularly for the adhesive bonding of glass crystals to surfaces of tubular elements, according to the invention, characterized in that it consists in preparing the application surface of a metallic element, in spreading an adhesive medium on said application surface and in making a single lateral face of a first stone to be applied adhere to said application surface, the axis of symmetry of said first stone defining a first angle of intersection with said application surface.

BRIEF DESCRIPTION OF THE DRAWINGS

Further characteristics and advantages of the invention will become more apparent from the description of a preferred, but not exclusive, embodiment of the method for applying stones to metallic elements, particularly for an adhesive bonding of glass crystals to surfaces of tubular elements, illustrated by way of non-limiting example with the help of the accompanying drawing wherein the sole FIGURE is a sectional view of the metallic element normal with respect to the application surface.

WAYS OF CARRYING OUT THE INVENTION

With reference to the FIGURE, the method for applying stones to metallic elements, particularly for the adhesive bonding of glass crystals to surfaces of tubular elements, according to the invention, comprises the steps of:

preparing the application surface 2 of a metallic element 9;

spreading an adhesive medium 3 on the surface 2;

making a single lateral face 4 of a first stone 5 to be applied adhere to the application surface 2, with the axis of symmetry 10 of the stone 5 defining an angle of intersection 8 with the surface 2.

Advantageously, a final drying takes place at a temperature comprised between 40° C. and 60° C., for a duration no less than two hours and no longer than three hours.

After the drying a finishing step can be provided, which is known per se.

The stones are positioned one after the other, in succession.

With reference to FIG. 1, the succession of stones involves the positioning of a second stone 6, which by means of the respective axis of symmetry 12 defines a second angle of intersection 11, next to the first stone 5.

The angle 11 will be the reversal of the first angle 8 of intersection about a vertical direction 7, which is normal with respect to the surface 2.

A third stone, which forms a third angle of intersection with the surface 2, will in turn be positioned in such a way that this third angle is the reversal of the second angle 11 about the direction 7 and, at the same time, is positioned parallel to the angle 8.

Substantially, the stones (the first stone 5, the second stone 6 and the subsequently applied stones), are positioned one next to the other, almost forming a single body, on the surface 2 in an unusual position, laid on the lateral face 4, tracing a sort of zig-zag pattern.

Preparing the application surface can comprise a milling, or scraping, or diamond-cutting, or an abrasion of the surface 2, in order to increase its roughness. This surface preparation merely serves to increase the roughness of the application surface so as to increase the interface between the adhesive material and the metal and thus secure the stones more firmly to the metallic element.

Advantageously, the adhesive medium 3 consists of a base substance mixed with a curing agent and a flexibility increasing component.

Preferably, the base substance consists of an epoxy resin enamel that is composed to at least 50% of polyglycol epichlorohydrin, the curing agent consists of a compound which contains 2,2-dimethyl-4,4-methylene-bis-cyclohexylamine at a concentration that can vary from 92 to 96% and the flexibility increasing component consists of a liquid solution based on a mixture of xylene isomers.

Another essential characteristic of the invention consists in the fact that the adhesive medium 3 used to apply stones to metallic elements, particularly for the adhesive bonding of glass crystals to surfaces of tubular elements, is constituted to ten parts by weight by a base substance that consists of a epoxy resin enamel composed to at least 50% by polyglycol epichlorohydrin, mixed with four parts by weight of a curing agent which contains 2,2-dimethyl-4,4-methylene-bis-cyclohexylamine at a concentration that can vary from 92 to 96% and further mixed one part of a flexibility increasing component that consists of a liquid solution based on a mixture of xylene isomers.

A further characteristic of the invention is the fact that the adhesive medium 3 is used in the field of silver ware, jewelry and gold ware, for the adhesive bonding of glass crystals to surfaces of tubular elements.

The method for applying stones to metallic elements, particularly for the adhesive bonding of glass crystals to surfaces of tubular elements, first helps to avoid needless pre-embedding operations that would increase the weight of the item of jewelry and enables the application of stones to jewelry, gold ware and silver ware products with super-low thicknesses, such as for example items of jewelry worn on the finger, wrist and neck.

From the foregoing description it can thus be seen that the invention achieves the intended aim and objects and in particular attention is drawn to the fact that a method is provided for applying stones to metallic elements that makes it possible to position the stones on low thicknesses, in particular the application of glass crystals to metallic elements made of alloy of gold, silver or other precious metal, with evident economic advantages owing to the continuous rise in the price of the metal (gold and silver in particular).

Another advantage of the method for applying stones to metallic elements is that it allows the manufacture of quality jewelry with a method that is quick and simple.

Last but not least, the use of means that are readily available on the market and the use of common materials ensure that the method is economically competitive.

The invention, thus conceived, is susceptible of numerous modifications and variations, all of which are within the scope of the appended claims.

Moreover, all the details may be substituted by other, technically equivalent elements.

In practice the materials employed, and the dimensions, may be any according to requirements, as long as they are consistent with the implementation aim.

The disclosures in Italian Patent Application No. AR2010A000029 from which this application claims priority are incorporated herein by reference.

Where technical features mentioned in any claims are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for applying stones to metallic elements, comprising:
preparing an application surface of a metallic tubular element;
spreading an adhesive medium on the application surface;
applying only a single lateral face of a first stone to the adhesive medium on the application surface so that the single lateral face of the first stone is adhered to the application surface with an axis of symmetry of the first stone defining a first angle of intersection with the application surface, each of the stones being brilliant cut crystal gems; and
applying a second stone next to said first stone and to the adhesive medium on the application surface so that the second stone is adhered to the application surface with an axis of symmetry of the second stone defining a second angle of intersection with the application surface, said second angle of intersection angle being a reversed angle with respect to said first angle of intersection about a vertical direction which is normal with respect to said application surface so that the second angle of intersection is a reversal of the first angle of intersection,
wherein each of the stones is a brilliant cut crystal gem.

2. The method according to claim 1, further comprising at least one final drying at a temperature that is no lower than 40° C. and no higher than 60° C.

3. The method according to claim 2, wherein said at least one final drying is no less than two hours and no longer than three hours.

4. The method according to claim 1, wherein said preparation of said application surface (2) comprises a milling.

5. The method according to claim 1, wherein adhesive medium comprises a base substance mixed with a curing agent and a flexibility increasing component.

6. The method according to claim 5, wherein said base substance consists of an epoxy resin enamel that is composed to at least 50% by polyglycol epichlorohydrin.

7. The method according to claim 5, wherein said curing agent consists of a compound that contains 2,2-dimethyl-4,4-methylene-bis-cyclohexylamine at a concentration that can vary from 92 to 96%.

8. The method according to claim 5, wherein said flexibility increasing component consists of a liquid solution based on a mixture of xylene isomers.

9. The method of claim 5, the adhesive medium for the application of stones to metallic elements, comprising ten parts by weight of a base substance that consists of an epoxy resin enamel composed to at least 50% by polyglycol epichlorohydrin, mixed with four parts by weight of a curing agent which contains 2,2-dimethyl-4,4-methylene-bis-cyclohexylamine at a concentration that can vary from 92 to 96% and further mixed with one part of a flexibility increasing component that consists of a liquid solution based on a mixture of xylene isomers.

10. The method according to claim 6, wherein said curing agent consists of a compound that contains 2,2-dimethyl-4,4-methylene-bis-cyclohexylamine at a concentration that can vary from 92 to 96% Use of an adhesive medium in the field of jewelry, gold ware and silver ware, according to claim 9, for the adhesive bonding of the stones to surfaces of tubular elements.

11. The method according to claim 6, wherein said flexibility increasing component consists of a liquid solution based on a mixture of xylene isomers.

12. The method according to claim 7, wherein said flexibility increasing component consists of a liquid solution based on a mixture of xylene isomers.

13. The method of claim 1, comprising the further step of applying a third stone next to said second stone and to the adhesive medium on the application surface so that the third stone is adhered to the application surface with an axis of symmetry of the third stone defining a third angle of intersection with the application surface, said third angle of intersection angle being a reversed angle with respect to said second angle of intersection about the vertical direction which is normal with respect to said application surface,
    wherein, said third angle of intersection is parallel to said first angle of intersection.

14. The method of claim 13, comprising the further step of applying a fourth stone next to said third stone and to the adhesive medium on the application surface so that the fourth stone is adhered to the application surface with an axis of symmetry of the fourth stone defining a fourth angle of intersection with the application surface, said fourth angle of intersection angle being a reversed angle with respect to said third angle of intersection about the vertical direction which is normal with respect to said application surface,
    wherein, said fourth angle of intersection is parallel to said second angle of intersection.

\* \* \* \* \*